United States Patent [19]

Milligan et al.

[11] Patent Number: 4,683,279
[45] Date of Patent: Jul. 28, 1987

[54] LOW MELTING URETHANE LINKED TOLUENEDIISOCYANATES

[75] Inventors: Barton Milligan, Coplay; William E. Starner, Freeland; Roland E. Grandin, Alburtis; Jeremiah P. Casey, Emmaus, all of Pa.

[73] Assignee: Air Products and Chemicals, Inc., Allentown, Pa.

[21] Appl. No.: 882,994

[22] Filed: Jul. 8, 1986

[51] Int. Cl.$^4$ ............................................. C08G 18/76
[52] U.S. Cl. ...................................... 528/67; 528/75; 528/76; 528/85; 560/26; 560/33
[58] Field of Search ..................... 528/57, 75, 76, 85; 560/26, 33

[56] References Cited

U.S. PATENT DOCUMENTS

| | | | |
|---|---|---|---|
| 2,969,386 | 1/1961 | McElroy | 260/471 |
| 3,020,249 | 2/1962 | Curtis | 260/2.5 |
| 3,023,228 | 2/1962 | Wagner et al. | 260/471 |
| 3,076,770 | 2/1963 | Saunders et al. | 260/2.5 |
| 3,218,348 | 11/1965 | McElroy et al. | 260/471 |
| 3,285,951 | 11/1966 | Weiss | 260/471 |

Primary Examiner—Maurice J. Welsh
Attorney, Agent, or Firm—Russell L. Brewer; James C. Simmons; E. Eugene Innis

[57] ABSTRACT

This invention relates to urethane linked mixtures of 2,4- and 2,6-toluenediisocyanates (ULTDI dimers) having low melting points and to a method of forming these systems. The urethane linked toluenediisocyanates containing from 45-90% of the 2,4- and 10-55% of the 2,6-isomer by weight are formed by reacting two moles of an appropriate isomer mix of toluenediisocyanate, with one mole of a specific alkylene glycol, e.g., 1,2-butanediol, diethylene glycol or dipropylene glycol under conditions such that essentially only one of the isocyanate groups on a toluenediisocyanate molecule reacts with a hydroxyl group of the glycol. Conditions are controlled such that the urethane linked toluenediisocyanates are formed. The resulting product, which has two unreacted isocyanate groups, is suited for producing a variety of elastomers including polyurethane polyurethane/urea or polyurea elastomers.

24 Claims, No Drawings

LOW MELTING URETHANE LINKED TOLUENEDIISOCYANATES

TECHNICAL FIELD

This invention relates to urethane linked toluenediisocyanates having low melting points which are well suited for producing polyurethane and polyurea elastomers and a method for producing them.

BACKGROUND OF THE INVENTION

Mononuclear aromatic polyisocyanates are well known and are widely used in the preparation of polyurethane and polyurethane/urea elastomers. These mononuclear aromatic diisocyanates generally include compositions such as toluenediisocyanate, phenylenediisocyanate, chlorotoluenediisocyanate and the like. In the preparation of polyurethane and polyurea elastomers the aromatic diisocyanates are reacted with a long chain polyol to produce a prepolymer containing free isocyanate which then may be chain extended with a short chain polyol or aromatic diamine to form a polyurethane or polyurethane/urea elastomer. Long chain polyols, e.g. those having a molecular weight of above 500, are generally utilized to form the prepolymer and the chain extender is a short chain polyol, e.g., $C_2$–$C_{10}$ glycol, or an aromatic diamine. The long chain polyol provides flexibility and elastomeric properties to the resin, while the short chain polyol or aromatic diamine provides short chain segments to chain extend or cross-link and add toughness and rigidity to the resulting resin.

A major problem with mononuclear aromatic diisocyanates, e.g., toluenediisocyanate (TDI) is that they are toxic and because of their low molecular weight, tend to be quite volatile. Because of their toxicity and volatility, extreme care must be taken in the work place to avoid inhalation and damage to the respiratory tract and contact with the skin. There is some literature on the subject of reacting aromatic diisocyanates, particularly toluenediisocyanate, with short chain polyols to increase their molecular weight and reduce volatility and the utilization of these polyol extended aromatic diisocyanates in the formation of polyurethanes. Representative compositions and processes are noted in the following articles.

U.S. Pat. No. 2,969,386, German Pat. Nos. 756,058 and 870,400 show a method of producing organic polyisocyanates, and particularly urethane polyisocyanates by reacting an aromatic diisocyanate, such as toluene diisocyanate with a short chain diol or triol such as ethylene glycol and trimethylol propane and mixtures with limited side reaction products. The '386 patent noted there were problems associated with the formation of TDI - free (<1%) polyisocyanates and side reactions occurred which lead to the formation of polymeric products. When the isocyanate reactant was increased, the product contained free unreacted toluenediisocyanate. In other prior art processes mixtures of compounds were produced.

The '386 patent attempted to solve the problem associated with the process described in the '058 and '400 patents by producing urethane polyisocyanates substantially devoid of unreacted diisocyanate and having limited side reaction products. Such result was achieved by (a) reacting the organic diisocyanate with polyol in an amount in excess over that stoichiometrically required, e.g., 2:1 molar ratio at a temperature above the melting point of the mixture but low enough, i.e., below 100° C., to avoid undesirable polymerization reactions; (b) extracting the resulting resin from the reaction mixture by contacting it with an aliphatic or acyclic hydrocarbon; and then, (c) separating the solvent layer which contains unreacted diisocyanate and polyol. By this technique one was able to obtain higher molecular weight urethane linked aromatic diisocyanates free of unreacted diisocyanate which then could be used for making polyurethanes.

Examples in the '386 patent show reacting a 65:35 mixture of 2,4- and 2,6-toluenediisocyanate with a polyol mixture of 1,3-butylene glycol, trimethylolpropane, and a polyester polyol containing 4.98% OH in a mole ratio of 3.70:0.18:0.28:0.0015, respectively, or 200% excess toluenediisocyanate in the presence of solvent at a temperature of 80° C. for a period of about 2 hours. After removal of unreacted toluenediisocyanate, a light amber solid soluble in ethyl acetate was prepared.

U.S. Pat. No. 3,285,951 discloses the preparation of adducts of 2,4-toluenediisocyanate and 2,3-butanediol containing 85% mesoisomer, with the mole ratio of toluenediisocyanate to butanediol being at least 2:1 preferably 2–4:1, for use in preparing polyurethanes. In one example. a product was prepared by dissolving toluenediisocyanate in a suitable solvent, such as hexane, stirring at high speed and adding butanediol to the solution. As the reaction was carried out, a solid white powder precipitated. The precipitate then was reacted with a millable gum of polypropylene glycol, butanediol and toluenediisocyanate.

U.S. Pat. No. 3,218,348, discloses the preparation of stable urethane polyisocyanate solutions by the sequential reaction of a polyisocyanate e.g., toluenediisocyanate with polyol mixture. To avoid crystallization on standing the polyisocyanate was reacted with a triol and then the resulting intermediate product was reacted with a diol. The patentees noted that when the procedure set forth in the '396 patent described above, was carried out adding the diol first, then the triol or simultaneously adding the diol and triol to the isocyanate in the presence of organic solvent, the reaction product was unstable in the solution and would crystallize within a matter of minutes or days.

U.S. Pat. No. 3,076,770 discloses a process for producing low density cellular polyurethane foams by the reaction of an organic polyisocyanate with short chain polyols and utilizing the sequential addition of a triol and diol as in U.S. Pat. No. 3,218,348. Typically, high molecular weight polyols along with trifunctional polyols had been used for foams. The cellular polyurethanes were prepared by first reacting an isocyanate with a diol/triol mixture and removing free isocyanate from the reaction product. The reaction product was dissolved in a solvent and then reacted with a polyester polyol to form polyurethane systems.

U.S. Pat. No. 3,020,249 discloses a process for preparing rigid and semi-rigid polyurethane foams from an alkyd polyester resin and a diisocyanate containing reaction product derived from the reaction of toluenediisocyanate and 1,2,6-hexanetriol. The hexanetriol containing excess diisocyanate adducts were formed by reacting toluenediisocyanate with hexanetriol containing excess diisocyanate at temperatures of 100°–120° C.; the toluenediisocyanate was included in substantial excess.

U.S. Pat. No. 3,023,228 discloses a process for producing solid low molecular weight urethane polyisocyanate/urea systems by reacting a diisocyanate e.g., toluenediisocyanate, with a mixture of a short chain diol, e.g. butanediol, and water in the presence of a solvent, e.g., acetonitrile. Temperatures from about 10°–35° C. are suggested as being suited for forming the reaction product. An example shows reacting toluenediisocyanate with ethylene glycol in the presence of water and acetone (solvent) for about one to two hours at which time the reaction mixture solidifies and a crystal magma forms. Another example described the reaction of toluenediisocyanate with diethylene glycol and water to produce a product having a softening point of 155° C. and an isocyanate content of 23.5%. The resulting low molecular weight products having an isocyanate content typically from 18–25%, are valuable as reactants in the production of polyurethane plastics.

SUMMARY OF THE INVENTION

This invention relates to urethane linked toluenediisocyanates (ULTDI) having low melting points formed by the reaction of toluenediisocyanate with specific aliphatic difunctional polyols in a manner such that a specific isomer ratio of 2,4- and 2,6-toluenediisocyanate is reacted with the polyol to produce low melting (about 30°–40° C.) urethane linked toluenediisocyanates. The reaction is carried out, under anhydrous conditions, at a temperature sufficient to effect reaction of one isocyanate on the ring of toluenediisocyanate but insufficient to effect reaction of the second isocyanate group on the toluenediisocyanate ring. Excess isocyanate is utilized during the reaction to minimize oligomer formation. The reaction product is then isolated from the reaction medium and has the general formula:

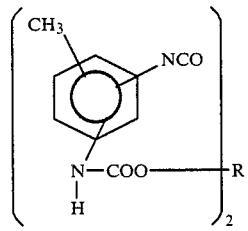

where R is the residue of a diol represented by the formula

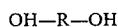

OH—R—OH where R is a $C_{2-12}$ alkylene radical having one or more of the following characteristics:
(a) one or more carbon-carbon unsaturated groups
(b) alkyl side chains having 2–6 carbon atoms or
(c) 1 to 3 ether oxygen atoms.

Included in the group of aliphatic diols are 1,2-butanediol, diethylene glycol, 2-butene-1,4-diol, dipropylene glycol, triethylene glycol and tripropylene glycol. Generally, the level of the 2,4-isomer in the reaction product should be from 45 to 90% by weight and the level of 2,6-isomer should be from 10 to 55% by weight.

The urethane linked toluenediisocyanates are unique and provide multiple advantages in elastomer synthesis. These advantages include:

a high level of isocyanate content/unit weight, e.g., isocyanate contents from 15–20%;

low melting or fluid characteristics at room temperature thus eliminating the need for solvents to effect processing;

very high solubility in toluenediisocyanate or methylene di(phenylisocyanate);

a mechanism through the inclusion of highly reactive functional groups, i.e. two isocyanate groups for producing polyurethane, polyurethane/urea and polyurea elastomers;

an ability to produce polyurethanes via a reaction injected molding technique due to the use of less reactive isocyanate systems as compared to methylene (diphenylisocyante) and yet adjust reactivity through selection of chain extenders of variable reactivity;

unique polyurethane/urea elastomers by virtue of an ability to substitute the urethane linked toluenediisocyanate at various levels for the isocyanate providing component on a 1:1 equivalent basis;

an ability to control polymer performance through hard segment and soft segment concentration and regularity through polyol selection and diisocyanate system symmetry thereby permitting one to produce a variety of elastomers having different elastomeric properties in terms of hardness, tensile and tear resistance;

an ability to form a reaction product that can provide a relatively uniform isocyanate content per unit weight unlike that in many prepolymer systems, and;

an ability to convert toluenediisocyanate to a composition of lower volatility thus making it more suited for industrial use by minimizing toxicity and reactivity problems associated with commercial isocyanates, while at the same time maintaining it in liquid form at process conditions for ease of processing.

DETAILED DESCRIPTION OF THE INVENTION

In the practice of this invention, toluenediisocyanate is reacted with nonsymmetric aliphatic diols and select aliphatic ether polyols to produce low molecular weight system. Representative toluenediisocyanates include the two main isomers, i.e., the 2,4- and the 2,6-diisocyanate and optionally, a small amount of the ortho isomers, e.g. the 2,3- and 3,4-isomers. Commercially, toluenediisocyanate is found as a 65:35 or 80:20 isomer mix of the 2,4- and 2,6-isomer by weight and optionally from 0–5% by weight of the ortho isomers. An isomer mix is preferred within that range, e.g., from 65–80% of the 2,4-isomer and the balance, i.e., 20–35% being essentially the 2,6-isomer.

The other reactant used in the process of forming the urethane linked toluenediisocyanate (ULTDI dimer) is a nonsymmetric aliphatic difunctional polyol having from 4–10 carbon atoms or symmetric aliphatic ether and represented by the formula:

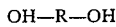

OH—R—OH where R is a $C_{2-12}$ alkylene radical having one or more of the following characteristics:
(a) one or more carbon-carbon unsaturated groups
(b) alkyl side chains having 2–6 carbon atoms or
(c) 1 to 3 ether oxygen atoms.

Preferred diols are selected from the group consisting of diethylene glycol, 1,2-butanediol, 1,4-but-2-ene diol, dipropylene glycol, triethyleneglycol and tripropylene glycol. Others included in the group having alkyl side chains are 1,2-pentanediol, 1,2-hexane diol, 1,2-heptanediol and 1,2 octanediol. Although it is conventional to use long chain polyols and particularly polymeric polyols having molecular weights of at least 500 and above, to form isocyanate prepolymers, these polymeric polyols do not permit the formation of toluenediisocyanate compositions having high isocyanate content per unit weight. Although they are low melting systems, they inherently contain unreacted toluenediisocyanate in order to keep the isocyanate content to an acceptable level. Another disadvantage of polyisocyanate prepolymers derived from long chain polyols is that they are limited to specific molecular weights which are dependent upon the polyol molecular weight. On the other hand, toluenediisocyanates and other products having melting points above 50° C., and generally above 40° C., make them undesirable from a processing standpoint. A solvent must be used. Examples of symmetric glycols which give high melting systems, and noted in the prior art, include ethylene glycol, 1,3-propanediol 1,3-butanediol and 1,4-butanediol.

One of the objectives of a commercial process utilizing an isomer mix as the reactant system is to react these isomers in amounts equal to the commercial feed ratio in which they are received. In that way, one does not accumulate an excess of a particular isomer reactant. Because toluenediisocyanate is available as an 65:35 or 80:20 mix by weight it would be preferred that the reaction product have a 2,6-isomer utilization of about 20-35%. Uniquely, the low melting urethane linked toluenediisocyanates preferably have an 80:20 and 65:35 isomer ratio and thus are advantageous in that the commercial feedstock is usable. The reaction products of this invention have broadly from 45-90% 2,4- and 10-55% of the 2,6-and preferably from about 75 to 85% of the 2,4-isomer and 15-25% of the 2,6-isomer and it is this weight ratio that is desired. In order to obtain this ratio in the final product however, a reaction feed having a greater 2,6-isomer content than 20% is required because of its lower reactivity than the 2,4-isomer. Reactant feed ratios of from 20 to 60% by weight of the 2,4-isomer and from 40-80% of the 2,6- are commonly required to achieve an appropriate end use ratio. This level is achieved by recycling unreacted 2,6-isomer and reducing the feed isomer ratio of 2,4- to 2,6- isomer.

Although not intending to be bound by theory, it is believed that the primary reason one can form the urethane linked toluenediisocyanate as defined herein is that the reaction of a first isocyanate group of toluenediisocyanate is relatively fast and that reaction of the second isocyanate group with a hydroxy group is relatively slow. Because of this difference in reactivity of the first isocyanate group and the second isocyanate group in the toluenediisocyanate ring whether the isomer is the 2,4- or 2,6-isomer, one can, with appropriate control, terminate the reaction after formation of the urethane linked toluenediisocyanate via reaction of the first isocyanate group and prior to the reaction of the second isocyanate group. This reactivity difference between the first and second isocyanate group then permits one to avoid formation of oligomers, i.e., 3 or more toluenediisocyanate molecules in the composition. An oligomer content of 10% by weight and preferably 5% or less in the overall reaction product is desired.

Even though there is an apparent difference in reactivity between the first and second isocyanate groups in toluenediisocyanate extreme care must be taken in order to prevent the reaction of the second isocyanate group with either a first or second hydroxy group in the organic polyol to prevent the formation of oligomers. Several criteria must be observed in order to produce the urethane linked toluenediisocyanate compositions; they are: one, the reaction is carried out at a temperature sufficiently low, e.g. 90° C. or less, such that only the first isocyanate group in the toluenediisocyanate reacts; and two, the isocyanate reactant is present in a substantial excess of the 2:1 stoichiometric molar ratio. The mole ratio of toluenediisocyanate to polyol should be at least 4:1, generally 4–30:1 preferably from 8 to 16:1.

A second major parameter influencing the selective formation of urethane linked toluenediisocyanates is temperature. Temperature may vary depending upon the reactivity of the aliphatic diol utilized but reactivity varies only slightly. The temperature of reaction for preparing such urethane linked toluenediisocyanate ranges from about −25° C. to below about 90° C., and preferably from about 20° to 40° C. When the temperature of reaction is increased above the 30° C. level e.g. to about 50°–80° C., one may experience substantial formation of particularly oligomers with lower levels of toluenediisocyanate. Oligomers in the reaction product may adversely detract from desired polymer properties. The best temperature range for forming the urethane linked toluenediisocyanate compositions is that where the reaction between the first isocyanate group and the difunctional polyol is relatively fast, while insufficient for effecting reaction between the second isocyanate group with a hydroxy group, e.g. 20° to 40° C.

Solvents can be used in the reaction and if used, one is selected in which the reactants and reaction product are soluble but which do not interfere with the reaction between the difunctional aliphatic polyol and toluenediisocyanate. Examples of solvents suited for practicing the process include acetone, dioxane, tetrahydrofuran, acetonitrile and so forth. Of these solvents, tetrahydrofuran is least desirable since it is often contaminated from the formation of peroxides. It is preferred to carry out the reaction in the absence of solvent in that it eliminates process steps required for the recovery of the solvent. Anhydrous conditions must be maintained during the reaction in view of the fact that water will react with the isocyanate groups resulting in formation of a urea linkage. When these linkages are present, the softening point increases as noted in U.S. Pat. No. 3,023,228.

A simple way of determining an appropriate temperature range or temperature for a given reactant system requires monitoring of the reaction through high performance liquid chromatography. Liquid chromatography provides a characterization of the reaction product and permits one to identify intermediates, as well as the reactants and high molecular weight oligomers. By monitoring free isocyanate content, and the extent of intermediate formation, one can select a preferred temperature within a temperature range to permit synthesis of the urethane linked toluenediisocyanate in high yield and selectivity without forming substantial quantities of oligomers. Of course, as the temperature is increased within this particular range, one will notice that a product mix will form and such mix may possibly contain some higher molecular weight oligomers. If oligomer content is excessive, e.g., above 10% by weight the temperature should be reduced and isocyanate reactant level increased to minimize oligomer production and maximize the production of urethane linked toluenediisocyanate.

The ratio of toluenediisocyanate to short chain aliphatic, difunctional polyol may vary over a wide range since the urethane linked toluenediisocyanate is relatively stable in the presence of both reactants and reaction product. However, as previously stated for purposes of minimizing oligomer formation, e.g., to a level of less than 2% by weight and facilitating separation of reactant from product, a reactant ratio of NCO/OH substantially greater than stoichiometric (2:1) is used, e.g., 4-30 moles toluenediisocyanate per mole aliphatic difunctional diol and preferably from 8-12 moles toluenediisocyanate per mole diol is utilized.

The reaction product is recovered from the reaction mixture in conventional manner. One of the easiest and more convenient techniques is as follows. After the reaction of toluenediisocyanate with the preselected polyol, excess isocyanate may be removed from the reaction product by distillation.

The following examples are provided to illustrate various embodiments of the invention for dissymmetric diols generating 9 ULTDI isomers as well as symmetric diols for which the number of possible ULTDI isomers is reduced to six with 2,4- and 2,6-toluenediisocyanate for the nonsymmetric diols. These isomers are 2,2-; 2,4-; 2,6-; 4,2-; 4,4-; 4,-6; 6,2-; 6,4-; and 6,6-; whereas the isomers for the symmetric diols are 2,2-; 2,4-; 2,6-; 4,4-; 4,6-; and 6,6-. They are not intended to restrict the scope thereof.

EXAMPLE 1

Toluenediisocyanate-1,2-butanediol Effect of Reactant Isomer Ratio on Product Isomer Mix To a clean, dry reaction flask equipped with a mechanical stirrer, thermometer, dropping funnel heating-/cooling jacket and nitrogen purge, were added variable isomer mixtures of 2,4- and 2,6-toluenediisocyanate. A portion of 1,2-butanediol was added slowly over a two-hour period thereby providing an 8:1 NCO-/OH mole ratio. The temperature was maintained from 20°-40° C. with constant agitation and by adjusting flow of water through the jacket. After all of the butanediol had been added, the reaction mixture was stirred for eight hours to ensure reaction. The product was recovered by distilling at 100° C. and 0.1 mm Hg in a wiped film apparatus to remove unreacted toluenediisocyanate.

TABLE I

| Isomer Content vs. Properties | | | |
|---|---|---|---|
| TDI Isomer Mix 2,4-/2,6-TDI % | | ULTDI Isomer Content % 2,4-2,6- | Softening |
| Before | After | 2,4-/2,6-TDI | Point |
| 0/100 | 0/100 | 0/100 | 109° C. |
| 20/80 | 11.5/88.5 | 45.4/54.6 | 38° C. |
| 35/65 | 23.1/76.9 | 70.7/29.3 | 32° C. |
| 50/50 | 40.4/59.6 | 80.9/19.1 | 30° C. |
| 65/35 | 57.7/42.3 | 87.1/12.9 | 32° C. |
| 80/20 | 74.4/25.6 | 96.8/3.2 | 38° C. |
| 100/0 | 100/0.0 | 100/0.0 | 52° C. |

The results above show that a reaction product made from a reactant containing 100% by weight of the 2,4-isomer of toluenediisocyanate had a high melting or softening point, i.e., of 52° C. and the melting point of the reaction products decreased with increasing 2,6-isomer content. On the other hand, when a reactant containing 100% 2,6-isomer was used, the melting or softening point increased from the 30°-38° C. range to 109° C. For commercial purposes, a melting or softening point from about 30°-40° C. is acceptable; melting or softening points which are higher present handling problems. The data thus show that a reaction product having from about 45-90% of the 2,4-isomer and 10-55% of the 2,6-isomer produces products having melting or softening points in a desired range. This level of 2,4- and 2,6-isomer results in an adequate isomer mix (9 with an unsymmetric diol and 6 with a symmetric ether diol) to produce low melting systems. For best utilization of commercial feedstocks, the reactant feed would contain appropriate levels at 2,4- and 2,6-isomer to produce a reaction product having from 65% to 80% of the 2,4-isomer and 20 to 35% of the 2,6-isomer. Advantageously, this range is one that also has the lowest melting reaction products.

Table 1 also shows the greater reactivity of the 2,4-isomer as compared to the 2,6-isomer and its percentage change as a reactant as noted from the before-after portion of the table.

EXAMPLE 2

Effect Of Diol On Melting or Softening Point

To a clean, dry reaction flask, variable amounts of a 50/50 mix of 2,4- 2,6-isomer system of toluenediisocyanate and variable diols were added to generate a product mix having an isomer ratio by weight of approximately 80% of a 2,4- and 20% of a 2,6-isomer mix. The preselected diols were added drop-wise over a one hour period. Reaction conditions, e.g., the 8:1 isocyanate to diol mole ratio remained essentially the same as in Example 1. Table II sets forth the results.

TABLE II

| | ULTDI Physical Properties | | | | |
|---|---|---|---|---|---|
| Diol | ULTDI Isomer % 2,4-2,6- | Softening Point (°C.) | Solubility in TDI (wt) | % NCO (Theo.) | Viscosity 7000 cps at |
| 1,2-Ethanediol | 80.1/19.9 | 145-155 | 10% | Not Available | — |
| 1,2-Propanediol | 81.0/19.0 | 120-125 | 10% | 20.2 (19.9) | — |
| 1,2-Butanediol | 80.9/19.1 | 30-32 | 50% | 19.0 (19.1) | 85° C. |
| 1,3-Butanediol | 80.4/19.6 | 85-90 | 10% | 16.5 (19.1) | — |
| 1,4-Butanediol | 80.0/20.0 | 95-100 | 10% | 18.8 (19.1) | — |
| 1,4-But-2-enediol | 80.0/20.0 | <20 | 50% | 18.2 (19.3) | 70° C. |
| 1,4-But-2-ynediol | 80.0/20.0 | 80-85 | 10% | Not Available | — |
| 1,6-Hexanediol | 81.1/18.9 | 120-123 | 10% | 14.7 (18.0) | — |
| 2-Methylpentane 2,4-diol | 74.2/25.8 | <20 | 50% | 17.6 (18.1) | 130° C. |
| Diethyleneglycol | 83.0/17.0 | <20 | 50% | 18.5 (18.8) | 67° C. |

TABLE II-continued

| Diol | ULTDI Isomer % 2,4-/2,6- | Softening Point (°C.) | Solubility in TDI (wt) | % NCO (Theo.) | Viscosity 7000 cps at |
|---|---|---|---|---|---|
| Dipropyleneglycol | 80.0/20.0 | <20 | 50% | 16.9 (17.4) | 85° C. |
| Triethylene glycol | 78.5/21.5 | <20 | 50% | 16.5 (16.9) | 61° C. |
| Tripropylene glycol | 80.6/19.4 | <20 | 50% | 15.5 (15.6) | 70° C. |

From Table II above, it can be seen that the nonsymmetric 1,2 butanediol 1,4-but-2-enediol, 2-methylpentane-2,4-diol and the symmetrical ether diols ULTDI systems have acceptable softening points. Although the 2-methylpentane 2,4-diol ULTDI system had a low softening point, it decomposed at elastomer cure temperature, as will be explained. The symmetrical diols, e.g. 1,2-ethanediol and 1,4-butanediol had high softening points. In addition, the low melting ULTDI systems derived from the nonsymmetric diols have low viscosity (7000 CPS) at moderate temperatures and are soluble in polyisocyanate compositions such as toluene-diisocyanate. All of the other ULTDI systems are high melting at about the 80:20 isomer ratio from the above Table II. Some of the above compositions existed as solids at room temperature and had glass characteristics. Those with a softening point (T°C. at which solid would flow under its own weight) of less than 20° C. were gummy at room temperature. No attempt was made to determine the actual subambient melting or softening point of the gums.

EXAMPLE 3

The procedure of Example 1 was repeated to determine the effect of toluenediisocyanate molar reactant level vis a vis polyol in the reaction mixture and its effect on oligomer formation. The diol used was 1,2-butanediol. The oligomer content (area) was obtained from HPLC analysis. The oligomer content (calc) was also calculated from the isocyanate concentration assuming the oligomer to be the 3 TDI/2 diol adduct, although other adducts were possible. The available isocyanate content was measured by ASTM method D2572-80. The formula below was used to calculate % oligomer. The calculations show most of the oligomer was the 3:2 adduct.

TABLE III

| Mole Excess TDI | ULTDI 2,4-/2,6-TDI | % NCO | Softening Point | % ULTDI (area) | % Oligomers (area) | % ULTDI (calc.) | % Oligomers (calc.) |
|---|---|---|---|---|---|---|---|
| 50% | 64.2/35.8 | 17.34% | 44° C. | 75.27 | 24.73 | 82.47 | 17.53 |
| 100% | 74.6/25.4 | 18.01% | 39° C. | 92.64 | 7.63 | 89.33 | 10.67 |
| 200% | 77.6/22.4 | 18.67% | 37° C. | 98.01 | 1.99 | 95.61 | 4.39 |
| 300% | 79.9/20.1 | 19.01% | 32° C. | 98.43 | 1.57 | 98.24 | 1.76 |
| 400% | | | 30° C. | 98.87 | 1.13 | — | — |
| 650% | | | 30° C. | 99.99 | 0.01 | — | — |
| 1400% | | | 30° C. | 100.00 | — | — | — |

% oligomer = ((Eq Wt NCO/% NCO) − Eq Wt ULTDI))/(Eq Wt Olig − Eq Wt ULTDI.)

From the table it can be seen that softening point of the reaction product is reduced with decreasing oligomer content and at oligomer levels of about 5% and less the melting point is 35° C. or less.

EXAMPLE 4

Polyurethane elastomer plaques were prepared from urethane linked toluenediisocyanate polyol systems from Example 2 having approximately 80% of the 2,4-isomer and 20% of the 2,6-isomer in conventional manner. The elastomers were based upon an isocyanate index of 1.05 and reacted with poly(tetramethylene glycol) sold under the trademark Terathane 1000. The urethane linked toluenediisocyanates incorporated in the specific systems were 1,2-butanediol, dipropylene glycol, diethylene glycol, and 2-butene-1,4-diol. A system utilizing 2-methyl pentane-2,4-diol was attempted, but the system decomposed during cure, thus eliminating it from testing. Physical testing was conducted on the plaques and the results reported are in Table IV.

TABLE IV

| | ULTDI Elastomers Diol Variation | | | | |
|---|---|---|---|---|---|
| ULTDI | 1,2-BDO | DPG | TPG | DEG | 2-Butene |
| Polyol (T-1000) | Terathane 1000 | | | | |
| NCO index | 1.05 | 1.05 | 1.05 | 1.05 | 1.05 |
| Shore A hardness | 58 | 58 | 62 | 60 | 60 |
| 100% tensile (psi) | 260 | 250 | 210 | 250 | 210 |
| 200% tensile (psi) | 360 | 300 | 250 | 280 | 230 |
| 300% tensile (psi) | 440 | 340 | 280 | 290 | 240 |
| Break tensile (psi) | 1590 | 1180 | 1120 | 1100 | 750 |
| % elongation (%) | 940 | 1140 | 1000 | 1040 | 1140 |
| Tear resistance (pli) | 190 | 160 | 130 | 150 | 100 |

BDO-ULTDI represents an 81:19 toluenediisocyanate/1,2-butanediol system
DPG-ULTDI represents an 80:20 toluenediisocyanate/dipropyleneglycol system
TPG-ULTDI represents an 79:21 toluenediisocyanate/tripropyleneglycol system
DEG-ULTDI represents an 83:17 toluenediisocyanate/diethylene glycol system
2-butene represents an 80:20 toluenediisocyanate/1,4-but-2-ene diol system From Table IV it can be seen that the tensile at break and tear resistance is much higher for the 1,2-BDO ULTDI system than with the other low melting ULTDI systems. Although % elongation is less than obtained with other systems, it is not significantly less considering the increase in tensile strength and tear resistance. The BDO/ULTDI system has significant application advantages because of the properties imparted to the elastomer.

Although not addressed in Table IV, but relevant to processability is the part that the ULTDI's had low enough viscosity to be used as neat components in the polyurethane formulations, they also have sufficient isocyanate solubility for use as additives.

EXAMPLE 5

Effect of 2.6-TDI Isomer

Polyurethane elastomers were prepared in accordance with Example 4 except that the urethane linked toluenediisocyanate 1,2 BDO system had various levels of the 2,6-TDI isomer in the product. The results are set forth in Table V. MOCA stands for methylene bis(orthochloroaniline).

TABLE V 2,6-TDI Isomer Effect on ULTDI Elastomers

| | | | | | | |
|---|---|---|---|---|---|---|
| 2,6-TDI isomer (%) | 0.00 | 3.20 | 12.90 | 19.10 | 29.30 | 54.60 |
| ULTDI (equivalents) | 1.050 | 1.050 | 1.050 | 1.050 | 1.050 | 1.050 |
| T-1000 (equivalents) | 0.825 | 0.825 | 0.825 | 0.825 | 0.825 | 0.825 |
| MOCA (equivalents) | 0.175 | 0.175 | 0.175 | 0.175 | 0.175 | 0.175 |
| Shore A Hardness | 73 | 74 | 73 | 74 | 81 | 84 |
| Shore D Hardness | 31 | 36 | 34 | 33 | 35 | 38 |
| 100% tensile (psi) | 260 | 280 | 270 | 330 | 480 | 810 |
| 200% tensile (psi) | 370 | 370 | 370 | 490 | 620 | 990 |
| 300% tensile (psi) | 500 | 480 | 480 | 710 | 770 | 1320 |
| Break tensile (psi) | 2030 | 2050 | 1920 | 2330 | 2400 | 4030 |
| % elongation (%) | 820 | 860 | 860 | 650 | 820 | 740 |
| Tear resistance (pli) | 180 | 180 | 180 | 220 | 290 | 440 |

The results in Table V show that as one increases the level of the 2,6-isomer in the BDO/ULTDI system from about the 19% level, at constant ULTDI equivalents in the polyurethane/urea elastomer, tensile strength increases without substantially decreasing % elongation. Tensile at break for 13%, 2,6-isomer went from 1920 psi to about 2300 psi for a 19% 2,6-isomer system. Tear resistance also increased from 180-220 while % elongation dropped slightly from 860-650%. Normally one expects a decrease in elongation with increased tensile strength. At the 29 and 54% 2-6 levels, tensile strength, % elongation and tear resistance increased from the 19% level.

EXAMPLE 6

Oligomer Effect on ULTDI Elastomer

Two polyurethane elastomer plaques were prepared from urethane linked toluenediisocyanate BDO systems in the same manner as in Example 4. The elastomers were formulated with 45.4 parts of Terathane 1,000 polyol, 7.1 parts MOCA and 36.2 parts of ULTDI, one having 17.5% oligomer and the other 1.76%. The components were preheated to 85° C., mixed and formed into a mold. The mold was closed and pressed at 2400 psig and 100° C. for 2 hours. The elastomer then was cured at 100° C. for 12 hours. Table IX provides results of physical properties.

TABLE IX

Physical Properties

| | High Oligomer | Low Oligomer |
|---|---|---|
| Reactant Ratio (TDI:BDO) | 3:1 | 8:1 |
| % Oligomer By Weight | 17.46 | 1.76 |
| % NCO | 17.40 | 19.01 |
| 2,6-TDI isomer (%) | 22.90 | 19.10 |
| ULTDI (equivalents) | 1.050 | 1.050 |
| T-1000 (equivalents) | 0.625 | 0.625 |
| MOCA (equivalents) | 0.375 | 0.375 |
| Shore A Hardness | 96 | 96 |
| Shore D Hardness | 55 | 59 |
| 100% tensile (psi) | 1760 | 2160 |
| 200% tensile (psi) | 2710 | 3300 |
| 300% tensile (psi) | 4000 | 4930 |
| Break tensile (psi) | 5600 | 5290 |
| % elongation (%) | 430 | 330 |
| Tear resistance (pli) | 670 | 750 |

The above results show that oligomer content does adversely affect elastomer properties. For example, test resistance is substantially lower. Although % elongation is less, this is rather common when there is a sizable increase in tear resistance.

EXAMPLE 7

RIM Elastomer Use

Reaction injection molded elastomers were prepared using a model SA8-20 laboratory machine (LIM Kunststoff Technologie Gmbh, Kittsee, Austria) suitable for processing two component mixtures. 10-30 cc/min metering pumps for components "A" (MDI or DEG-ULTDI Table IV diisocyanate) and "B" (polyol plus chain extender plus catalysts) are driven synchronously by sprocket wheels in proportion to the mixture to be processed by means of a variable speed (50-250 rpm) motor. Any desired mixing ratio may be established by changing gears. Components A and B are conveyed into a mixing chamber by individually contolled compressed air actuated valves. A high speed rotor, continuously adjustable from 10,000 to 18,000 rpm, mixes the components. The pump block and mixing head are movable, and may be automatically advanced to a stationary mold by compressed air. A replaceable 'O' ring accomplishes a seal between mixing head and mold.

Polyurethane-urea elastomers were made from commercial modified liquid methylene di(phenylisocyanate) MDI (Isonate 181 from Dow Chemical) or DEG-ULTDI reaction with high (5000 g/mole) molecular weight triol (Voranol 4815 from Dow Chemical) supplemented with aromatic diamine chain extender (diethyltoluenediamine or DETDA). An isocyanate index of 1.03 was sought for all elastomers and checked by machine 'calibration shots' of unmixed, unreacted A and B components through the model SA8-20 sampling ports designed for this purpose. Stream temperatures were set by controlled circulation of thermostatted water through the double walled A and B reservoirs, the mixing block temperature by electrical resistance heaters.

Molds were thermostatted before mounting on a jig to which the mixing head was conveyed during the injection molding operation. 200×200×2 mm and 200×200×3 mm cavities in nominally 26×27×4 cm aluminum molds were treated with mold release agents before each injection. After injection the mixing rotor was washed in situ with dioctylphthalate, blown clean with nitrogen and readied for the next injection shot as the mold was unmounted and opened.

Test plaques were cured for 1 hour at 121° C., freed of mold release agent, and properly conditioned for analytical testing by exposure to 23°+/−2° C. at 50+−5% relative humidity for 40 hours. Physical properties were measured in accordance with ASTM procedures. Hardness (ASTM D2240) and tensile (ASTM D1708) measurements are the average of five determinations each, tear resistance (ASTM D624, die C) the average of three determinations on die-cut 2 mm thick pieces. Yield tensile is reported for the crosslinked RIM elastomers due to the characteristic shape of the Instron stress-strain curve. Also tabulated are flexural modulus and maximum stress (ASTM D1708) determined on each of five 1"×3" specimens from the 3 mm plaques and sag, a measure of thermal stability (ASTM D3769) measured on 4" and 6" overhangs using 3 mm thick plaque samples. Table X provides the results.

TABLE X

Urethane-linked Toluene Diisocyanate RIM Elastomer

| CH_EXTENDER | DETDA | DETDA |
|---|---|---|
| CH EX pph | 22 | 22 |
| POLYOL | V 4815 | V 4815 |
| ISOCYANATE | MDI | DEG_ULTDI |
| NCO index | 1.04 | 1.02 |
| Shore A Hardness | 95 | 96 |
| Shore D Hardness | 49 | 56 |
| 100% tensile (psi) | 1970 | 1890 |
| 200% tensile (psi) | 2720 | 2550 |
| 300% tensile (psi) | 3510 | 3210 |
| yield tensile (psi) | 1370 | 1550 |
| break tensile (psi) | 3770 | 3350 |
| % elongation (%) | 340 | 320 |
| tear resistance (pli) | 610 | 650 |
| maximum stress (psi) | 1420 | 1590 |
| flexural modulus (psi) | 28000 | 36350 |
| sag (125° C., 1 hr) ("/4") | .12 | .50 |
| sag (125° C., 1 hr) ("/6") | .77 | 2.14 |

In Table X, the RIM elastomer made from the DEG-ULTDI system is seen to be superior in room temperature flexural modulus to a comparable piece made using the MDI quasi prepolymer. The thermal stability of the DEG-ULTDI based elastomer is inferior due to less phase segregation of less symmetric 'hard segment' made up of predominantly urea from reaction of isocyanate with amine chain extender. At equivalent pump-block temperatures of 80° C. and B side stream temperatures of 52° C. the lower reactivity of the ULTDI urethane-linked diisocyanate was quantified by a mold fill study. At 81°-87° C. the ULTDI completely filled a 3 mm mold (145–150 gram including mold runner fill) at the lowest machine pump speed. The MDI quasi prepolymer, despite a lower stream temperature of 71° C., only filled the mold ¾ full (114 g) before gelation backpressure exceeded machine fill conditions. This lower reactivity of the ULTDI System allows formation of polyurethane ureas with greater chain extender content using equivalent machine fill rates.

What is claimed is:

1. A process for producing a low melting urethane linked toluenediisocyanate which comprises the steps:
  (a) reacting an isomer mix of 2,4- and 2,6-toluene diisocyanate with a short chain diol selected from the group consisting of dipropylene glycol, diethylene glycol 1,2-butanediol, 1,4-but-2-ene diol, triethylene glycol and tripropylene glycol;
  (b) maintaining a temperature sufficient to effect reaction between a first isocyanate group of said toluenediisocyanate and a hydroxy group of said short chain diol, but insufficient for effecting reaction with a second isocyanate group on the toluenediisocyanate ring and a hydroxy group;
  (c) maintaining a stoichiometric excess of toluenediisocyanate to said diol
  (d) utilizing an isomer mix such that the reaction product contains from about 45 to 90% by weight of the 2,4-isomer and 10 to 55% of the 2,6-isomer; and
  (e) isolating the reaction product from the reaction medium.

2. The process of claim 1 wherein the reaction temperature is maintained is from about −25° to about 90° C., and the oligomer content is less than 10% by weight.

3. The process of claim 2 wherein the mole ratio of said toluenediisocyanate to short chain diol using reactions is from about 4–30:1.

4. The process of claim 2 wherein the isomer mix is adjusted such that the reaction product has from 75 to 85% by weight of the 2,4-isomer and 15–25% of the 2,6-isomer.

5. The process of claim 4 wherein the mole ratio of toluenediisocyanate to diol is maintained at a level from 8–20:1 and the oligomer content is less than about 5% by weight.

6. The process of claim 4 wherein said diol is 1,2-butanediol.

7. The process of claim 4 wherein said diol is diethlylene glycol.

8. The process of claim 4 wherein said diol is dipropylene glycol.

9. The process of claim 4 wherein said diol is 1,4-but-2-ene diol.

10. A process for producing a low melting urethane linked toluenediisocyanate which comprises the steps:
  (a) reacting an isomer mix of 2,4- and 2,6-toluenediisocyanate with a short chain diol represented by the formula:

OH—R—OH where R is a $C_{2-12}$ alkylene radical having one or more of the following characteristics:
   (a) one or more carbon-carbon unsaturated groups
   (b) alkyl side chains having 2–6 carbon atoms or
   (c) 1 to 3 ether oxygen atoms.
  (b) maintaining a temperature sufficient to effect reaction between a first isocyanate group of said toluenediisocyanate and a hydroxy group of said short chain diol, but insufficient for effecting reaction with a second isocyanate group on the toluenediisocyanate ring and a hydroxy group;
  (c) maintaining a stoichiometric excess of toluenediisocyanate to said diol
  (d) utilizing an isomer mix such that the reaction product contains from about 45 to 90% by weight of the 2,4-isomer and 10 to 55% of the 2,6-isomer; and
  (e) isolating the reaction product from the reaction medium.

11. The process of claim 10 wherein in step C the mole ratio of toluenediisocyanate to diol is from 8–20:1 and the oligomer content is less than 10% by weight.

12. The process of claim 11 wherein the isomer mix is adjusted such that the reaction product has from 75–85% by weight of the 2,4-isomer and 15–25% of the 2,6-isomer.

13. The process of claim 11 wherein R in said short chain diol is the residue from 1,2 butane diol.

14. The process of claim 11 wherein R in said short chain diol is the residue from diethylene glycol.

15. The process of claim 11 wherein R in said short chain diol is the residue from tripropylene glycol.

16. A low melting urethane linked toluenediisocyanate composition represented by the formula:

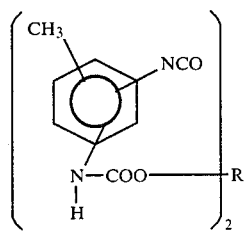

where R is the residue of a nonsymmetric aliphatic diol or symmetric ether diol represented by the formula:

OH—R—OH where R is $C_{2-12}$ alkylene radical having one or more of the following characteristics:
(a) one or more carbon-carbon unsaturated groups
(b) alkyl side chains having 2–6 carbon atoms or
(c) 1 to 3 ether oxygen atoms,
(b) maintaining a temperature sufficient to effect reaction between a first isocyanate group of said toluenediisocyanate and a hydroxy group of said short chain diol, but insufficient for effecting reaction with a second isocyanate group on the toluenediisocyanate ring and a hydroxy group;
(c) maintaining a stoichiometric excess of toluenediisocyanate to said diol
(d) utilizing an isomer mix such that the reaction product contains from about 45 to 90% by weight of the 2,4-isomer and 10 to 55% of the 2,6-isomer; and
(e) isolating the reaction product from the reaction medium.

17. The low melting composition of claim 16 wherein R is the residue from a diol selected from the group consisting of 1,2-butanediol, diethylene glycol, 2-butene-1,4-diol, dipropylene glycol, triethylene glycol and tripropylene glycol.

18. The low melting composition of claim 16 wherein the weight percent of 2,4-isomer is from 45 to 90% and the weight percent of 2,6-isomer is from 10 to 55% and the reaction product has 10% or less by weight of oligomers.

19. The low melting composition of claim 18 wherein the percent 2,4-isomer by weight is from 65 to 80% and the percent 2,6-isomer by weight is from 20 to 35%.

20. The low melting composition of claim 16 where R is the residue from 1,2-butanediol.

21. The low melting composition of claim 16 wherein R is the residue from dipropylene glycol.

22. The low melting composition of claim 16 wherein R is the residue from diethyleneglycol.

23. The low melting composition of claim 16 wherein R is the residue from triethylene glycol.

24. The low melting composition of claim 16 wherein R is the residue from tripropylene glycol.

* * * * *

UNITED STATES PATENT AND TRADEMARK OFFICE
CERTIFICATE OF CORRECTION

PATENT NO.   :   4,683,279

DATED        :   28 July 1987

INVENTOR(S)  :   Barton Milligan, et al.

It is certified that error appears in the above-identified patent and that said Letters Patent is hereby corrected as shown below:

```
Column 15, Line 22
     Delete "," and substitute therefor --.--

Column 15, Lines 23-30
     Delete subparagraphs (b) and (c)

Column 16, Lines 1-6
     Delete subparagraphs (d) and (e)
```

Signed and Sealed this

Sixteenth Day of February, 1988

*Attest:*

DONALD J. QUIGG

*Attesting Officer*         *Commissioner of Patents and Trademarks*